(12) United States Patent
Yonezawa et al.

(10) Patent No.: US 10,156,463 B2
(45) Date of Patent: Dec. 18, 2018

(54) FLUID FLOW RATE MEASURING DEVICE AND WATER METER

(71) Applicant: Semiconductor Components Industries, LLC, Phoenix, AZ (US)

(72) Inventors: Yoshiaki Yonezawa, Ora-gun (JP); Hideo Kondo, Ora-gun (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 1139 days.

(21) Appl. No.: 13/754,512

(22) Filed: Jan. 30, 2013

(65) Prior Publication Data

US 2013/0197831 A1  Aug. 1, 2013

(30) Foreign Application Priority Data

Jan. 31, 2012 (JP) .................................. 2012-018319

(51) Int. Cl.

| | |
|---|---|
| *G01F 1/56* | (2006.01) |
| *G01D 4/02* | (2006.01) |
| *G01F 1/075* | (2006.01) |
| *G01F 1/58* | (2006.01) |
| *G01F 15/075* | (2006.01) |
| *G01F 1/60* | (2006.01) |

(52) U.S. Cl.
CPC ................. *G01F 1/56* (2013.01); *G01D 4/02* (2013.01); *G01F 1/075* (2013.01); *G01F 1/58* (2013.01); *G01F 1/60* (2013.01); *G01F 15/0755* (2013.01)

(58) Field of Classification Search
CPC .............. G01F 1/56; G01F 1/075; G01D 4/02
See application file for complete search history.

(56) References Cited

U.S. PATENT DOCUMENTS

| | | | | |
|---|---|---|---|---|
| 3,127,594 | A * | 3/1964 | Roe ........................ | G01R 11/16 250/214.1 |
| 3,287,960 | A * | 11/1966 | Abercrombie, Jr. ...... | F04B 9/10 346/62 |
| 3,425,280 | A * | 2/1969 | Foster ...................... | G01F 1/34 250/231.11 |
| 3,489,006 | A * | 1/1970 | Holdsworth ......... | G01K 17/185 374/41 |

(Continued)

FOREIGN PATENT DOCUMENTS

| | | |
|---|---|---|
| JP | 2008-224320 | 9/2008 |
| JP | 2008224320 A * | 9/2008 |
| WO | WO 2011160080 A1 * | 12/2011 ............. A61B 5/031 |

*Primary Examiner* — Gregory J Toatley
*Assistant Examiner* — Brandon Becker
(74) *Attorney, Agent, or Firm* — Rennie William Dover (57) ABSTRACT

A water meter that requires neither a smoothing capacitor of large capacitance nor a high frequency reference clock is offered. A rotation detection unit is formed to include a first coil, a first capacitor, a charging transistor, a power supply line, an activation transistor, an output buffer circuit, a DA converter, a comparator and a counter. A first LC resonant circuit is provided with the activation transistor connected in series with the first coil, the first capacitor connected in parallel with the first coil and the charging transistor for charging the first capacitor. The first LC resonant circuit is activated by turning on the activation transistor after the first capacitor is charged by turning on the charging transistor.

22 Claims, 8 Drawing Sheets

(56) References Cited

U.S. PATENT DOCUMENTS

| | | | | |
|---|---|---|---|---|
| 3,585,634 A * | 6/1971 | Sharples | H03M 1/44 | 341/155 |
| 3,633,416 A * | 1/1972 | Van Dyke | G01F 1/26 | 73/199 |
| 3,818,204 A * | 6/1974 | Hadida | G01D 1/04 | 327/336 |
| 3,950,989 A * | 4/1976 | Meirowitz | G01F 15/0755 | 73/861.77 |
| 4,034,721 A * | 7/1977 | Lenzi | F02D 41/182 | 123/459 |
| 4,120,031 A * | 10/1978 | Kincheloe | G06Q 20/342 | 235/432 |
| 4,370,892 A * | 2/1983 | Schmoock | G01F 1/60 | 327/552 |
| 4,620,143 A * | 10/1986 | Matty | H02P 27/08 | 318/811 |
| 4,630,004 A * | 12/1986 | Niehenke | H03B 5/187 | 331/107 SL |
| 4,651,286 A * | 3/1987 | Fukai | G01F 1/60 | 702/45 |
| 4,704,907 A * | 11/1987 | Mannherz | G01F 1/60 | 73/861.17 |
| 4,843,890 A * | 7/1989 | Samson | G01F 1/8413 | 73/861.356 |
| 4,847,519 A * | 7/1989 | Wahl | G05F 3/22 | 327/536 |
| 4,922,187 A * | 5/1990 | Beverly, II | G01D 4/002 | 324/142 |
| 5,248,935 A * | 9/1993 | Sakoyama | G06G 7/02 | 324/103 R |
| 5,321,990 A * | 6/1994 | Lang | G01F 1/3218 | 73/861.24 |
| 5,408,917 A * | 4/1995 | Lussi | A47J 31/007 | 219/428 |
| 5,559,447 A * | 9/1996 | Rees | H03K 19/00361 | 326/30 |
| 5,729,180 A * | 3/1998 | Brown | G01F 1/667 | 331/17 |
| 6,008,749 A * | 12/1999 | Smith | H03M 1/403 | 341/163 |
| 6,111,470 A * | 8/2000 | Dufour | H03L 7/0895 | 327/156 |
| 6,388,503 B1 * | 5/2002 | Maloney | H03K 19/00361 | 327/380 |
| 6,604,417 B1 * | 8/2003 | Koike | G01F 1/684 | 73/204.22 |
| 7,102,453 B1 * | 9/2006 | Rohde | H03B 5/04 | 331/117 R |
| 7,589,983 B1 * | 9/2009 | Lin | H02M 3/33515 | 323/367 |
| 8,185,762 B1 * | 5/2012 | Spangler | G06F 1/3265 | 713/323 |
| 2001/0021114 A1 * | 9/2001 | Terashi | H02M 3/33569 | 363/16 |
| 2003/0160651 A1 * | 8/2003 | Lin | H03K 5/19 | 330/2 |
| 2005/0261842 A1 * | 11/2005 | Yamagishi | G01F 1/684 | 702/45 |
| 2006/0064217 A1 * | 3/2006 | Grasshoff | B60R 21/01 | 701/45 |
| 2006/0164065 A1 * | 7/2006 | Hoouk | G05F 1/67 | 324/76.17 |
| 2007/0207766 A1 * | 9/2007 | Hayama | G03B 23/00 | 455/352 |
| 2008/0042632 A1 * | 2/2008 | Chapuis | H02M 3/157 | 323/283 |
| 2008/0063902 A1 * | 3/2008 | Kawasaki | H01M 8/04007 | 429/10 |
| 2009/0103332 A1 * | 4/2009 | Sotiriou | H02J 7/025 | 363/15 |
| 2009/0295503 A1 * | 12/2009 | Harada | H03H 7/0115 | 333/174 |
| 2010/0134085 A1 * | 6/2010 | Nishida | H02M 3/1563 | 323/285 |
| 2010/0277152 A1 * | 11/2010 | MacFarlane | H02M 3/07 | 323/288 |
| 2013/0006453 A1 * | 1/2013 | Wang | B60W 50/0205 | 701/22 |
| 2013/0167652 A1 * | 7/2013 | Pflum | G01F 1/075 | 73/861 |
| 2013/0197831 A1 * | 8/2013 | Yonezawa | G01F 1/56 | 702/47 |
| 2013/0303967 A1 * | 11/2013 | Utz | A61B 5/031 | 604/8 |
| 2014/0184314 A1 * | 7/2014 | Takahashi | G01R 31/3613 | 327/524 |

\* cited by examiner

FIG.1

FIG.2
(WHEN COIL IS ABOVE INSULATOR PORTION)

FIG.3
(WHEN COIL IS ABOVE METAL PORTION)

FLUID FLOW RATE MEASURING DEVICE AND WATER METER

CROSS-REFERENCE OF THE INVENTION

This application claims priority from Japanese Patent Application No. 2012-018319, filed Jan. 31, 2012, the content of which is incorporated herein by reference in its entirety.

BACKGROUND OF THE INVENTION

Field of the Invention

This invention relates to a fluid flow rate measuring device and a water meter that are capable of electronically measuring a flow rate of a liquid or a gas.

Description of the Related Art

There has been known an electronic water meter using a magnetic sensor or an LC resonant circuit. The water meter using the magnetic sensor is disclosed in Japanese Patent Application Publication No. 2008-224320, for example. The water meter using the LC resonant circuit is used in Europe in recent years. The water meter using the LC resonant circuit is hereafter explained.

Figure 7:
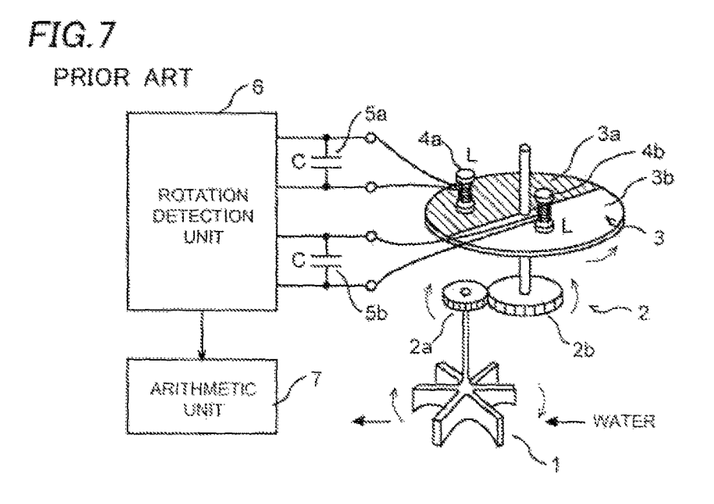
FIG. 7 shows a structure of a conventional water meter.

FIG. 7 is a schematic drawing showing a structure of the water meter using the LC resonant circuit. The water meter is composed of an impeller 1, a rotation reduction unit 2, a circular plate 3, a rotation detection unit 6 and an arithmetic unit 7. The rotation detection unit 6 has a first coil 4a, a second coil 4b, a first capacitor 5a and a second capacitor 5b.

The impeller 1 is placed in a water pipe and rotates at a rotation speed proportional to a flow rate (an amount of water flowing through the water pipe per unit time) of the water. The rotation speed of the impeller 1 is reduced by the rotation reduction unit 2 and transferred to a rotating shaft running through a center of the circular plate 3. The rotation reduction unit 2 is formed including a small gear 2a having a smaller number of teeth and a large gear 2b having a larger number of teeth and meshing with the small gear 2a, and its reduction rate is determined by a ratio between the number of teeth of the small gear 2a and the number of teeth of the large gear 2b. The number of gears included in the rotation reduction unit 2 and the number of teeth of each of the gears may be increased or decreased in accordance with the reduction rate required. As a result, the circular plate 3 rotates at a rotation speed (one rotation per second, for example) that is significantly smaller than the rotation speed of the impeller 1.

Figure 8:
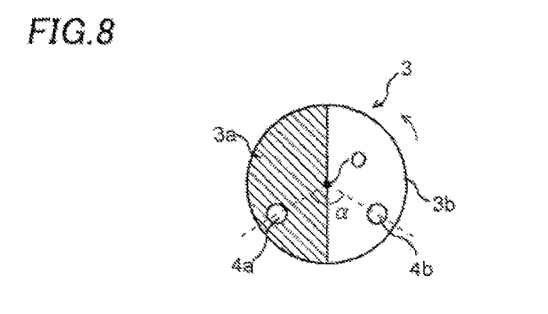
FIG. 8 is a plan view showing a structure of a circular plate.

The circular plate 3 is composed of a metal portion 3a (made of copper, for example) in a semicircular shape disposed on its principal surface and an insulator portion 3b (made of resin, for example) in a semicircular shape disposed on the rest of the principal surface other than the metal portion 3a, as shown in FIG. 8.

The first coil 4a and the second coil 4b are disposed above the circular plate 3. The first coil 4a and the first capacitor 5a form a first LC resonant circuit, while the second coil 4b and the second capacitor 5b form a second LC resonant circuit.

An oscillation signal is generated when the first LC resonant circuit is activated by applying an activation pulse, for example. Attenuation of the oscillation signal differs depending on whether the first coil 4a is above the metal portion 3a or above the insulator portion 3b. That is, when the first coil 4a is above the metal portion 3a, the first coil 4a loses more energy because an eddy current is caused in the metal portion 3a due to electromagnetic induction by the first coil 4a. As a result, the oscillation signal of the first LC resonant circuit attenuates relatively fast.

When the first coil 4a is above the insulator portion 3b, on the other hand, the attenuation of the oscillation signal of the first LC resonant circuit is determined by internal resistances of the coil, transistor, capacitor and the like, and is relatively slow because no eddy current is caused. Therefore, by periodically sampling a change in the attenuation of the oscillation signal, it is made possible to obtain information on a location of the first coil 4a above the circular plate 3 (that is, whether the coil 4a is above the metal portion 3a or above the insulator portion 3b) at each of the sampling times. The arithmetic unit 7 finds the rotation speed of the circular plate 3 from a change in the information on the location of the first coil 4a over the time.

Then, the arithmetic unit 7 calculates the rotation speed of the impeller 1 from the rotation speed of the circular plate 3 and the reduction rate of the rotation reduction unit 2. The arithmetic unit 7 also calculates the flow rate of the water from known correlation between the rotation speed of the impeller 1 and the flow rate of the water. The arithmetic unit 7 is a microcomputer, for example.

It is understood that the rotation speed of the circular plate 3 can be obtained with the first LC resonant circuit only when it is determined based on the measurement principle as described above. However, it is made possible to detect not only the rotation speed but also a direction of the rotation of the circular plate 3 at the same time by using both the first and second LC resonant circuits. In this case, a minimum sampling rate to detect the location by the first and second LC resonant circuits is represented by Equation (1):

$$\text{Minimum Sampling Rate} = 2 \times 360°/\alpha \times RV\max \qquad (1)$$

where $\alpha$ denotes an angle between the first coil 4a and the second coil 4b, that is, an angle formed by a line connecting the first coil 4a and the center O of the circular plate 3 and a line connecting the second coil 4b and the center O of the circular plate 3. RVmax denotes a maximum rotation speed of the circular plate 3.

When $\alpha$ is 90°, for example, the minimum sampling rate is 8×RVmax. Assuming that the maximum rotation speed of the circular plate 3 is one rotation per second, the minimum sampling rate comes to be 8/second.

Figure 9:
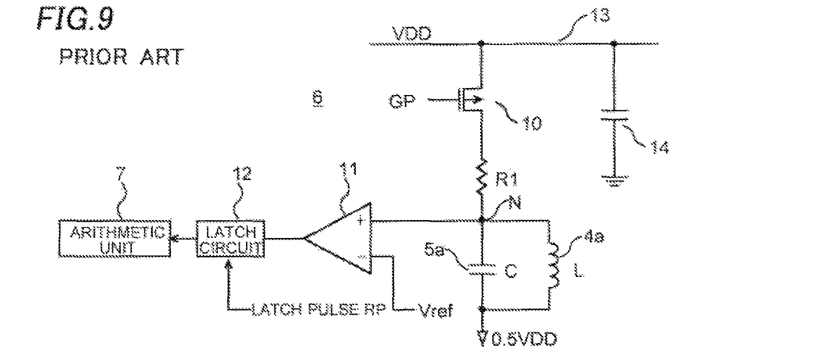
FIG. 9 is a circuit diagram of a rotation detection unit in the conventional water meter.

Next, a concrete structure of the rotation detection unit 6 is explained referring to FIG. 9. Since the first and second LC resonant circuits have the same structure, only a portion including the first LC resonant circuit is explained below.

As shown in the drawing, the rotation detection unit 6 is formed to include an activation transistor 10 made of a P-channel type MOS transistor, a resistor R1 for current limiting, the first coil 4a, the first capacitor 5a, a comparator 11, a latch circuit 12, a power supply line 13 and a capacitor 14 for smoothing. The first LC resonant circuit is formed by connecting the first coil 4a and the first capacitor 5a in parallel.

Figure 10:
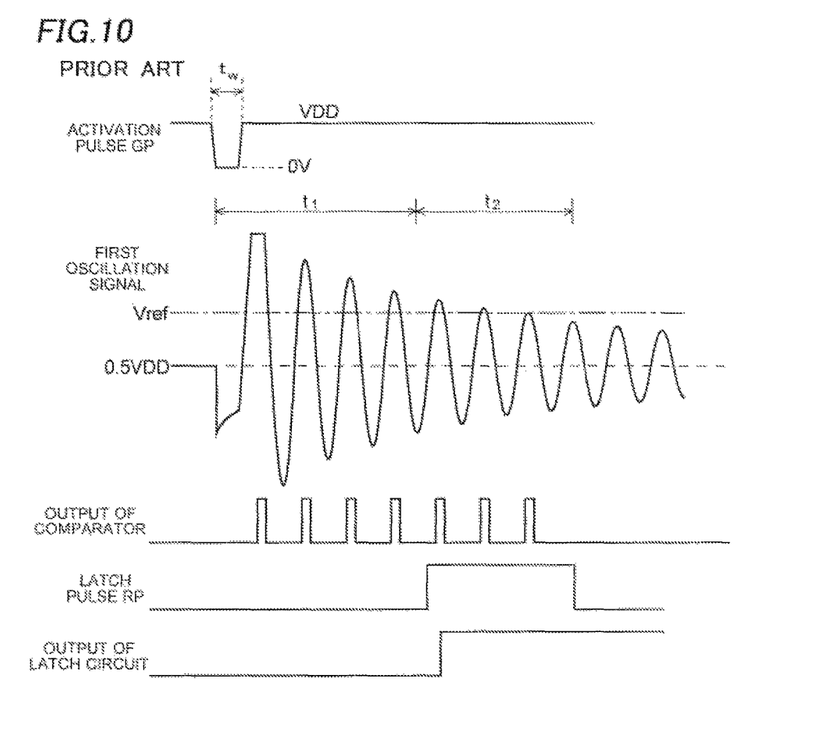
FIG. 10 is an operational waveform diagram of the rotation detection unit in the conventional water meter.

When the activation pulse GP of an L level (0 V) is applied to the activation transistor 10, the activation transistor 10 is turned on for a period corresponding to a pulse width tw of the activation pulse GP, as shown in FIG. 10. The activation pulse GP is periodically generated in accordance with the sampling rate. When the activation transistor 10 is turned on accordingly, a current is supplied from the power supply line 13 to the first LC resonant circuit through the activation transistor 10 to activate the first LC resonant circuit so that the first oscillation signal is generated at a node N. An oscillation frequency fosc of the first oscillation signal is represented by Equation (2):

$$f_{osc} = \frac{1}{2\pi} \times \sqrt{1/LC} \quad (2)$$

where L denotes an inductance of the first coil 4a, and C denotes a capacitance of the first capacitor 5a.

The comparator 11 compares the first oscillation signal with a reference voltage Vref. A center voltage of the first oscillation signal is set to 0.5 VDD, while the reference voltage Vref is set to a voltage between 0.5 VDD and VDD. Thus, an output from the comparator 11 becomes an H level when the first oscillation signal is larger than Vref, and becomes the L level when the first oscillation signal is smaller than Vref. The output from the comparator 11 makes a pulse train.

The latch circuit 12 latches the pulse outputted from the comparator 11 in response to a latch pulse RP. The latch circuit 12 is structured so that it latches the pulse outputted from the comparator 11 in response to the latch pulse RP that is generated during a measuring period t2 after a predetermined delay time t1 from the generation of the activation pulse GP.

FIG. 10 shows the first oscillation signal in the case where the first coil 4a above the insulator portion 3b, thus the attenuation of the first oscillation signal is relatively slow. Therefore, there is a period of time within the measuring period t2 during which the first oscillation signal is higher than the reference voltage Vref. Since the comparator 11 outputs the pulse during the period, the latch circuit 12 latches the pulse and holds data "1" (H level).

When the first coil 4a is above the metal portion 3a, on the other hand, the attenuation of the oscillation signal is relatively fast. As a result, the latch circuit 12 holds data "0" (L level), since the oscillation signal attenuates to a voltage lower than the reference voltage Vref in the measuring time t2 and the comparator 11 does not output the pulse.

Figure 11A:
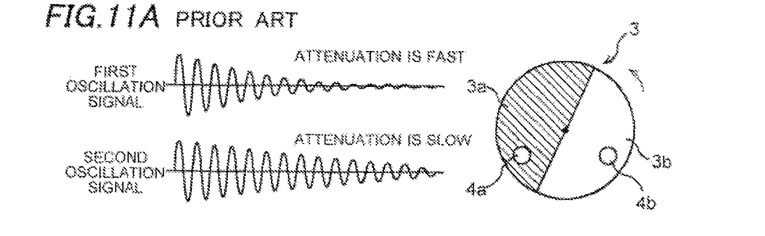
FIGS. 11A-11D show correlation between rotation states and oscillation signals in the conventional water meter.
Figure 11B:
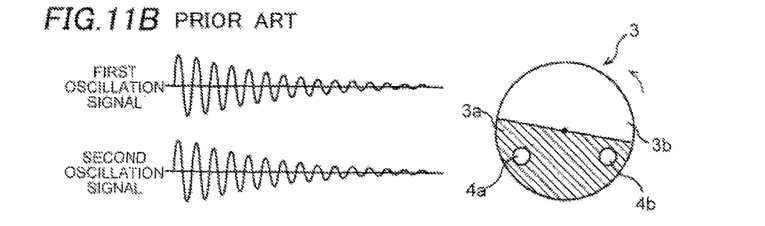
Figure 11C:
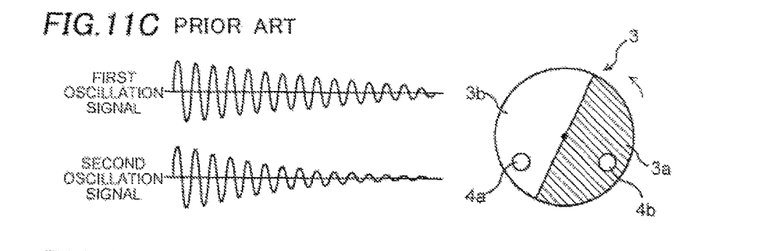
Figure 11D:
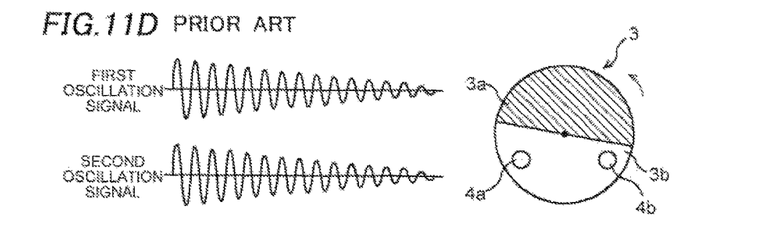
Figure 12:
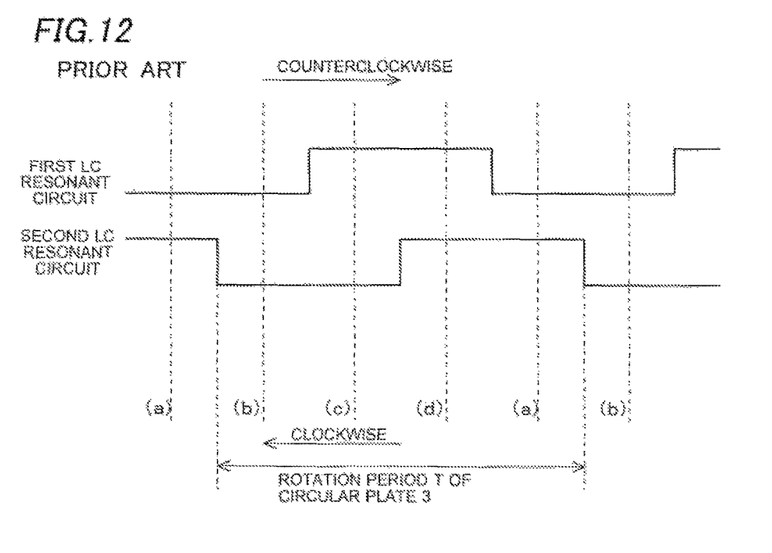
FIG. 12 shows correlation between the rotation states and data held in latch circuits in the rotation detection unit in the conventional water meter.

Therefore, the rotation detection unit 6 including the first and second LC resonant circuits is capable of identifying four rotation states (a)-(d), as shown in FIGS. 11 and 12.

In the rotation state (a), the first coil 4a is above the metal portion 3a, while the second coil 4b is above the insulator portion 3b. At that time, the first oscillation signal from the first LC resonant circuit attenuates faster than the second oscillation signal from the second LC resonant circuit. Therefore, the data held by the latch circuits 12 in the first and second LC resonant circuits is represented as (0, 1).

In the rotation state (b), both the first coil 4a and the second coil 4b are above the metal portion 3a. At that time, both the first oscillation signal and the second oscillation signal attenuate fast. Therefore, the data held by the latch circuits 12 in the first and second LC resonant circuits is represented as (0, 0).

In the rotation state (c), the first coil 4a is above the insulator portion 3b, while the second coil 4b is above the metal portion 3a. At that time, the second oscillation signal attenuates faster than the first oscillation signal. Therefore, the data held by the latch circuits 12 in the first and second LC resonant circuits is represented as (1, 0).

In the rotation state (d), both the first coil 4a and the second coil 4b are above the insulator portion 3b. At that time, both the first oscillation signal and the second oscillation signal attenuate slowly. Therefore, the data held by the latch circuits 12 in the first and second LC resonant circuits is represented as (1, 1).

Therefore, it is possible to find a rotation period T of the circular plate 3 based on the change in the data held by the two latch circuits 12 over time. The rotation speed of the circular plate 3 is 1/T that is an inverse of the rotation period T. Since single sampling gives the data showing one of the four rotation states (a)-(d), measurement precision of the rotation speed of the circular plate 3 can be increased by increasing the sampling rate.

It is also possible to determine the direction of the rotation of the circular plate 3 base on the order of appearance of the four rotation states (a)-(d). That is, when the rotation states appear in the order (a)→(b)→(c)→(d), it is understood that the circular plate 3 rotates counterclockwise, and when the rotation states appear in the order (d)→(c)→(b)→(a) to the contrary, it is understood that the circular plate 3 rotates clockwise, as shown in FIG. 12.

With the conventional water meter described above, however, a spike current flows through the power supply line 13 because the activation transistor 10 is instantaneously turned on when the LC resonant circuit is activated by applying the activation pulse GP. The spike current causes a voltage change in the power supply line 13, which may cause malfunctioning of the circuit. Therefore, the smoothing capacitor 14 of a large capacitance is required to suppress the voltage change.

In addition, precise control of the pulse width tw of the activation pulse GP is required in order to activate the LC resonant circuit with enough amplitude because of a reason described below. A single rectangular pulse includes a fundamental harmonic and higher harmonics, and its frequency is determined by a pulse width of the rectangular pulse.

The fundamental harmonic has the highest energy. The higher the order of each of the harmonics is, the lower its energy is. In order to obtain the oscillation generated by the LC resonant circuit of this invention most efficiently, it is required that the frequency of the fundamental harmonic of the activation pulse coincides with a resonant frequency of the LC resonant circuit. A resolution of a pulse width control circuit is determined by a frequency of a supplied reference clock CLK. When the LC resonant frequency is 1 MHz, for example, the reference clock CLK of 10-20 times of the frequency is required, which causes a problem of increased current consumption.

This invention is directed to offering a water meter and more generally a fluid flow rate measuring device by improving the rotation detection unit 6 so as to suppress the spike current so that neither the smoothing capacitor 14 of large capacitance nor the high frequency reference clock is required.

SUMMARY OF THE INVENTION

A fluid flow rate measuring device of this invention is provided with a circular plate comprising a metal portion disposed on its principal surface and an insulator portion disposed on the rest of the principal surface and measures the fluid flow rate based on a rotation speed of the circular plate which is proportional to the liquid flow rate. The fluid flow measuring device has an LC resonant circuit provided with a coil disposed above the principal surface of the circular plate, a first switching device connected in series with the coil, a capacitor connected in parallel with the coil and a second switching device for charging the capacitor and activated to output an oscillation signal by turning on the first switching device after charging the capacitor by turning on the second switching device, a comparator comparing the oscillation signal from the LC resonant circuit with a reference voltage, a counter counting a number of pulses outputted from the comparator and an arithmetic unit obtaining information on whether the coil is above the metal portion or above the insulator portion of the circular plate based on the number of pulses counted by the counter and calculating the rotation speed of the circular plate based on the information.

A water meter of this invention has a circular plate provided with a metal portion disposed on its principal surface and an insulator portion disposed on the rest of the principal surface and rotating at a rotation speed proportional to a flow rate of the water, an LC resonant circuit provided with a coil disposed above the principal surface of the circular plate, a first switching device connected in series with the coil, a capacitor connected in parallel with the coil and a second switching device for charging the capacitor and activated to output an oscillation signal by turning on the first switching device after charging the capacitor by turning on the second switching device, a comparator comparing the oscillation signal from the LC resonant circuit with a reference voltage, a counter counting a number of pulses outputted from the comparator and an arithmetic unit obtaining information on whether the coil is above the metal portion or above the insulator portion of the circular plate based on the number of pulses counted by the counter and calculating the rotation speed of the circular plate based on the information.

DETAILED DESCRIPTION OF THE INVENTION

First Embodiment

Overall Structure of Water Meter

A water meter according to a first embodiment of this invention is realized by improving the rotation detection unit 6 in the water meter shown in FIG. 7. Arithmetic operations by the arithmetic unit 7 are modified accordingly. Other structures are the same as those described in the related art. The circular plate 3 has the same structure as shown in FIG. 8, and is composed of a metal portion 3a (made of copper, for example) in a semicircular shape disposed on its principal surface and an insulator portion 3b (made of resin, for example) in a semicircular shape disposed on the rest of the principal surface other than the metal portion 3a.

Structure of Rotation Detection Unit 6A

Figure 1:
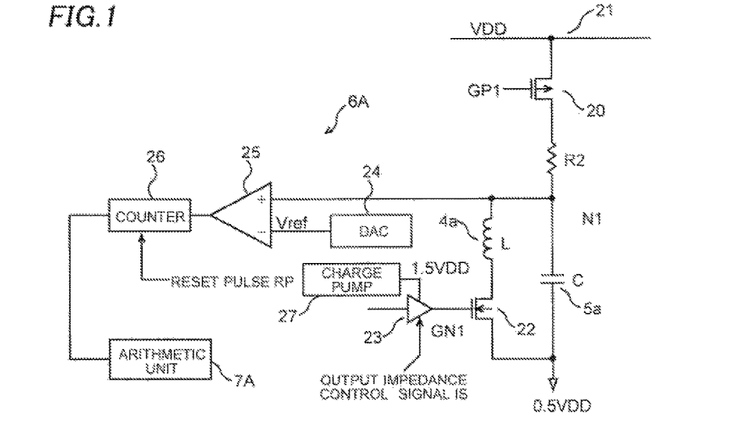
FIG. 1 is a circuit diagram of a rotation detection unit in a water meter according to a first embodiment of this invention.

An improved rotation detection unit 6A is provided with a first LC resonant circuit that includes a first coil 4a and a first capacitor 5a and a second LC resonant circuit that includes a second coil 4b and a second capacitor 5b. Since the first and second LC resonant circuits have the same structure, only a portion including the first LC resonant circuit is explained below.

The rotation detection unit 6A is structured to include the first coil 4a, the first capacitor 5a, a charging transistor 20 made of a P-channel type MOS transistor, a power supply line 21, a resistor R2 for current limiting, an activation transistor 22 made of an N-channel type MOS transistor, an output buffer circuit 23, a DA converter 24, a comparator 25, a counter 26 and a charge pump circuit 27, as shown in FIG. 1. The activation transistor 22 makes an example of "first switching device" of this invention, while the charging transistor 20 makes an example of "second switching device" of this invention.

The first LC resonant circuit is provided with the activation transistor 22 connected in series with the first coil 4a, the first capacitor 5a connected in parallel with the first coil 4a and the charging transistor 20 for charging the first capacitor 5a.

A source of the charging transistor 20 is connected to the power supply line 21 that is provided with a power supply voltage VDD (3.3 V, for example). A drain of the charging transistor 20 is connected to a connecting node N1 between the first coil 4a and a terminal of the first capacitor 5a through the resistor R2. The source of the activation transistor 22 and the other terminal of the first capacitor 5a are connected with each other and a voltage 0.5 VDD is applied to a connecting node between them. The voltage 0.5 VDD makes a center voltage of a first oscillation signal of the first LC resonant circuit. The center voltage 0.5 VDD can be generated by resistance-dividing of the power supply voltage VDD, for example. The center voltage 0.5 VDD may be modified to another voltage between 0 V and the power supply voltage VDD.

A charging pulse GP1 to start charging of the first capacitor 5a is applied to a gate of the charging transistor 20. An activation pulse GN1 to start oscillation of the first LC resonant circuit is applied to a gate of the activation transistor 22 through the output buffer circuit 23. The charging pulse GP1 and the activation pulse GN1 are applied cyclically. A period of the cycle determines a sampling rate.

The power supply voltage VDD is boosted by the charge pump circuit 27 to 1.5 VDD that is supplied to the output buffer circuit 23. By doing so, an H level of the activation pulse GN1 becomes 1.5 VDD and its L level becomes 0 V so that an ON resistance of the activation transistor 22 is reduced.

It is preferable that the output buffer circuit 23 is structured so that its output impedance can be adjusted in response to an output impedance control signal IS. By doing so, it is made possible that a rise time tup, which the activation pulse GN1 takes in transition from the L level to the H level when the first LC resonant circuit is activated, is adjusted so that the oscillation of the first LC resonant circuit is activated properly.

In this case, the output buffer circuit 23 may be formed of a plurality of output transistors connected in parallel and only the output transistors selected in accordance with the output impedance control signal IS are put into an output enable state. The rise time tup of the activation pulse GN1 may be adjusted by a method other than adjusting the output impedance such as adjusting an output capacitance of the output buffer circuit 23.

After the first capacitor 5a is charged by turning on the charging transistor 20 in response to the charging pulse GP1, the charging transistor 20 is turned off and then the first LC resonant circuit is activated to output the first oscillation signal from the connecting node N1 by turning on the activation transistor 22. That is, the first LC resonant circuit generates the first oscillation signal in a period during which the activation transistor 22 is turned on.

The DA converter 24 converts a digital signal of predetermined bits retained in a register (not shown) and outputs the analog reference voltage Vref. The DA converter 24 may be formed of a ladder resistor circuit known to the public. In this case, it is preferable that the level of the reference voltage Vref can be adjusted by modifying the digital signal inputted to the DA converter 24.

While the reference voltage Vref is set to the voltage between the center voltage 0.5 VDD of the oscillation signal and the power supply voltage VDD, the number of pulses outputted from the comparator 25 can be set appropriately by adjusting the level of the reference voltage Vref. Other reference voltage source (a band gap type reference voltage generation circuit, for example) and a regulator to adjust the level of the reference voltage Vref may be used instead of the DA converter 24.

The comparator 25 compares the first oscillation signal from the first LC resonant circuit with the reference voltage Vref from the DA converter 24. The counter 26 counts the number of pulses outputted from the comparator 25. The counter 26 is configured to be reset by a reset pulse RP.

The second oscillation signal from the second LC resonant circuit is also compared with the reference voltage Vref by the comparator 25 and the number of pulses from the comparator 25 is counted by the counter 26. By displacing the period during which the first oscillation signal is outputted (the period during which the activation transistor 20 is turned on) from the period during which the second oscillation signal is outputted so as not to overlap with each other, shared use of the DA converter 24, the comparator 25 and the counter 26 is made possible as well as preventing interference between the first and second oscillation signals.

For example, at first, the first oscillation signal is outputted from the first LC resonant circuit and the counter 26 counts the number of pulses. The number counted by the counter 26 is transferred to the arithmetic unit 7A and stored in a register in the arithmetic unit 7A. Then, the counter 26 is reset by the reset pulse RP. After that, the second oscillation signal is outputted from the second LC resonant circuit and the counter 26 counts the number of pulses. The number counted by the counter 26 is transferred to the arithmetic unit 7A.

The arithmetic unit 7A samples the information on whether the first coil 4a or the second coil 4b is above the metal portion 3a or above the insulator portion 3b of the circular plate 3 in time sequence based on the number counted by the counter 26, and calculates the rotation speed of the circular plate 3 based on the information. Then, the flow rate of the water is calculated based on the rotation speed. The arithmetic unit 7A is a microcomputer, for example.

[Operation of Rotation Detection Unit 6]

Figure 2:
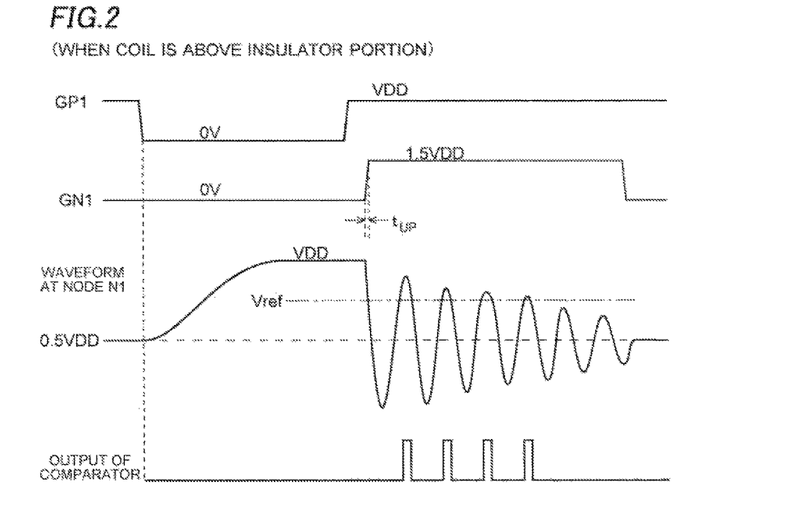
FIG. 2 is a first operational waveform diagram of the rotation detection unit according to the first embodiment of this invention.
Figure 3:
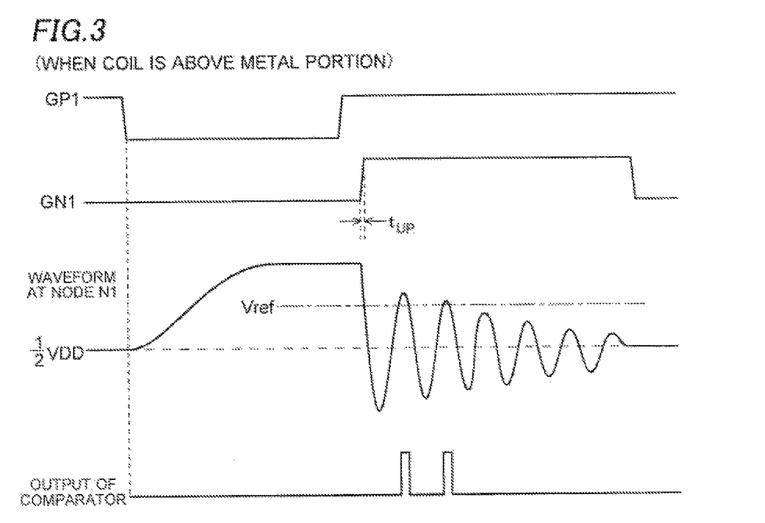
FIG. 3 is a second operational waveform diagram of the rotation detection unit according to the first embodiment of this invention.

Next, operation of the rotation detection unit 6 is explained referring to FIGS. 2 and 3.

(1) When the first coil 4a is above the insulator portion 3b of the circular plate 3

At first, the charging pulse GP1 is at the H level and the activation pulse GN1 is at the L level, thus both the charging transistor 20 and the activation transistor 22 are turned off, as shown in FIG. 2. In this state, the first capacitor 5a is not charged at all. That is, a difference between electric potentials at the both ends of the first capacitor 5a is 0 V. The connecting node N1 in the first LC resonant circuit is at 0.5 VDD.

The charging transistor 20 is turned on when the charging pulse GP1 falls to the L level in this state. Then, a current is supplied to the first capacitor 5a through the charging transistor 20 to charge the first capacitor 5a. When the first capacitor 5a is charged so that the connecting node N1 reaches the power supply voltage VDD, the charging pulse GP1 rises to the H level to turn off the charging transistor 20.

After the charging transistor 20 is turned off, the activation pulse GN1 rises to the H level (1.5 VDD) to turn on the activation transistor 22. Then, the first LC resonant circuit formed of the first coil 4a and the first capacitor 5a is activated to generate the first oscillation signal at the connecting node N1. The first oscillation signal is generated in a period during which the activation transistor 22 is turned on. The first LC resonant circuit halts the oscillation when the activation pulse GN1 falls to the L level to turn off the activation transistor 22.

The output from the comparator 25 becomes the H level when the first oscillation signal is larger than Vref, and becomes the L level when the first oscillation signal is smaller than Vref. The output from the comparator 25 makes a pulse train. Attenuation of the first oscillation signal is relatively slow since the first coil 4a is above the insulator portion 3b of the circular plate 3 in this case. Therefore, relatively large number of pulses are outputted from the comparator 25. Although FIG. 2 shows an example in which four pulses are outputted, a larger number of pulses are outputted in an actual case. The counter 26 counts the number of pulses.

(2) When the first coil 4a is above the metal portion 3a of the circular plate 3

While timings to generate the charging pulse GP1 and the activation pulse GN1 are the same as those in the case of (1), the energy loss of the first coil 4a increases and the attenuation of the first oscillation signal is relatively fast in this case since the first coil 4a is above the metal portion 3a of the circular plate 3, as shown in FIG. 3. As a result, the number of pulses outputted from the comparator 25 is smaller compared with the case of (1). FIG. 2 shows an example in which two pulses are outputted. The counter 26 counts the number of pulses similarly.

Since the number counted by the counter 26 is small in the case where the first coil 4a (or the second coil 4b) is above the metal portion 3a of the circular plate 3 and is large in the case where the first coil 4a (or the second coil 4b) is above the insulator portion 3b of the circular plate 3 as described above, the arithmetic unit 7A can identify the four rotation states (a)-(d) shown in FIGS. 11 and 12 in accordance with the number counted by the counter 26. The arithmetic unit 7A can discern whether the counted number is large or small by comparing the number counted by the counter 26 with a predetermined reference value, for example.

In the rotation state (a), the first coil 4a is above the metal portion 3a, while the second coil 4b is above the insulator portion 3b. At that time, the first oscillation signal from the first LC resonant circuit attenuates faster than the second oscillation signal from the second LC resonant circuit. As a result, the number counted by the counter 26 corresponding to the first oscillation signal is small, while the number counted by the counter 26 corresponding to the second oscillation signal is large.

In the rotation state (b), both the first coil 4a and the second coil 4b are above the metal portion 3a. Thus, both the number counted by the counter 26 corresponding to the first oscillation signal and the number counted by the counter 26 corresponding to the second oscillation signal are small.

In the rotation state (c), the first coil 4a is above the insulator portion 3b, while the second coil 4b is above the metal portion 3a. Thus, the number counted by the counter 26 corresponding to the first oscillation signal is large, while the number counted by the counter 26 corresponding to the second oscillation signal is small.

In the rotation state (d), both the first coil 4a and the second coil 4b are above the insulator portion 3b. Thus, both the number counted by the counter 26 corresponding to the first oscillation signal and the number counted by the counter 26 corresponding to the second oscillation signal are large.

Therefore, it is possible to find the rotation period T of the circular plate 3 based on the change in the number counted by the counter 26 over time. The rotation speed of the circular plate 3 is 1/T that is an inverse of the rotation period T. Since single sampling gives the data showing one of the four rotation states (a)-(d), measurement precision of the rotation speed of the circular plate 3 can be enhanced by increasing the sampling rate. When the circular plate 3 makes one rotation per second, the sampling rate is 16/second, for example.

It is also possible to determine the direction of the rotation of the circular plate 3 based on the order of appearance of the four rotation states (a)-(d). That is, when the rotation states appear in the order (a)→(b)→(c)→(d), it is understood that the circular plate 3 rotates counterclockwise, and when the rotation states appear in the order (d)→(c)→(b)→(a) to the contrary, it is understood that the circular plate 3 rotates clockwise, as shown in FIG. 12.

The shape of the metal portion 3a of the circular plate 3 is not limited to the semicircular shape, and may be a fan-shape as long as the rotation states of the circular plate 3 can be identified. In this case, the insulator portion 3b is in a fan-shape that is formed by removing the metal portion 3a. When only the rotation speed of the circular plate 3 is to be measured, providing only the first LC resonant circuit including the first coil 4a is sufficient.

Although the water meter according to the first embodiment uses the same LC resonant circuit method as the conventional water meter, the structure of the rotation detection unit 6A is different. That is, since the first LC resonant circuit is directly activated by the activation transistor 10 in the conventional rotation detection unit 6, there is caused a large spike current. Therefore, it is necessary to provide the power supply line 13 with the smoothing capacitor 14 of large capacitance. On the other hand, since the rotation detection unit 6A according to the first embodiment adopts the structure in which the first capacitor 5a is charged by the charging transistor 10 before turning on the activation transistor 22 to activate the first LC resonant circuit, the generation of the spike current can be suppressed and the need for the smoothing capacitor 14 of large capacitance can be eliminated as a result. Also, about 100Ω is enough as a resistance of the resistor R2 for current limiting which is connected in series with the charging transistor 20.

In addition, while the conventional rotation detection unit 6 requires the high frequency reference clock as high as about 10 MHz in order to control the pulse width tw and the delay time t1 of the activation pulse GP, the rotation detection unit 6A according to the first embodiment does not require such high frequency reference clock. That is because the pulse width of each of the charging pulse GP1 and the activation pulse GN1 is several tens of microseconds or longer which is much longer than that of the activation pulse GP in the conventional rotation detection unit 6.

Second Embodiment

Next, a structure of a water meter according to a second embodiment of this invention is explained referring to FIGS. 4A-6. The water meter according to the second embodiment differs from the water meter according to the first embodiment in that it uses three sensor coils that are first through third coils 4a-4c, as shown in either of FIGS. 4A and 4B.

Figure 4A:
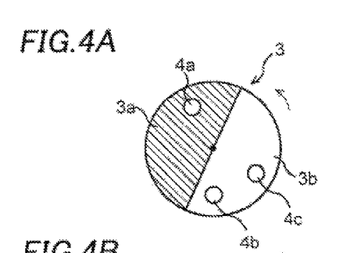
FIGS. 4A and 4B are plan views showing a circular plate in a water meter according to a second embodiment of this invention.

In the structure shown in FIG. 4A, a circular plate 3 has the same structure as shown in FIG. 8, and is composed of a metal portion 3a (made of copper, for example) in a semicircular shape disposed on its principal surface and an insulator portion 3b (made of resin, for example) in a semicircular shape disposed on the rest of the principal surface other than the metal portion 3a. The first through third coils 4a-4c are disposed above the circular plate 3.

Figure 4B:
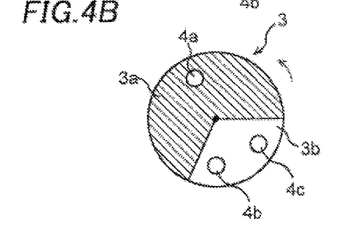

The circular plate 3 may be formed of a metal portion 3a in a fan-shape with a central angle of 180° or above and an insulator portion 3b in a fan-shape with a central angle of less than 180°, as shown in FIG. 4B. The semicircular shape can be regarded as a fan-shape with a central angle of 180°.

Figure 5:
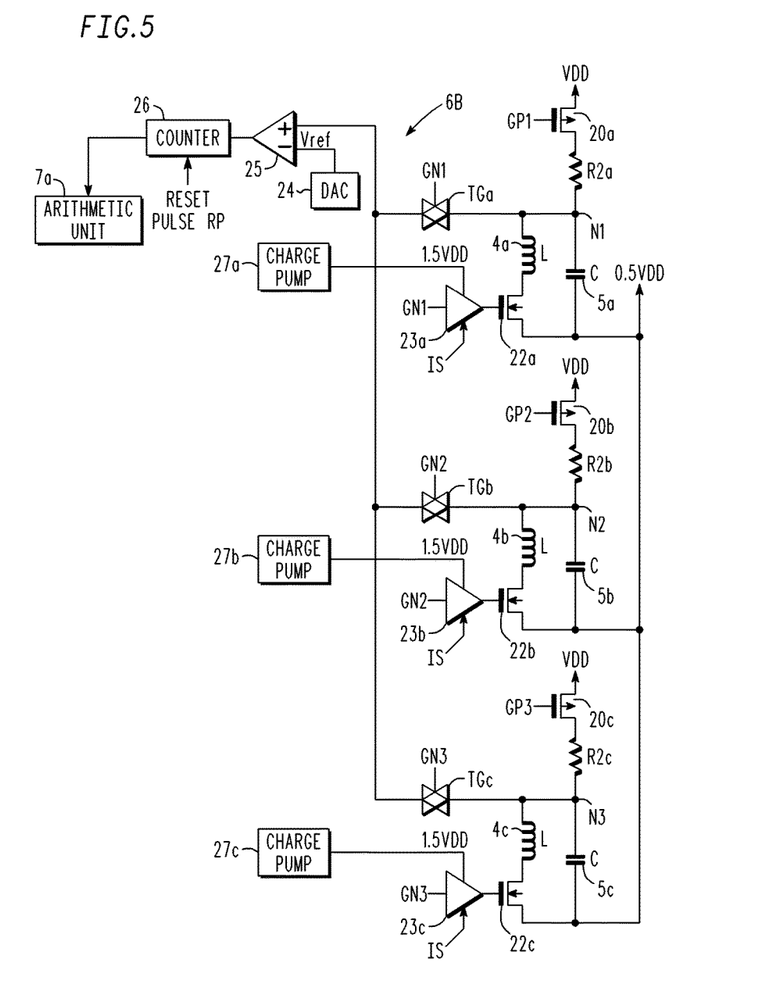
FIG. 5 is a circuit diagram of a rotation detection unit in the water meter according to the second embodiment of this invention.

A rotation detection unit 6B according to the second embodiment has first, second and third LC resonant circuits each corresponding to each of the first, second and third coils 4a, 4b and 4c respectively, as shown in FIG. 5. Each of the first, second and third LC resonant circuits is formed to include each of first, second and third charging transistors 20a, 20b and 20c, each of first, second and third resistors R2a, R2b and R2c, each of first, second and third capacitors 5a, 5b and 5c, each of first, second and third activation transistors 22a, 22b and 22c, and each of first, second and third output buffer circuits 23a, 23b and 23c, respectively. Each of the first, second and third output buffer circuits 23a, 23b and 23c has the same structure as the structure of the output buffer circuit 23 in the water meter according to the first embodiment.

Each of first, second and third oscillation signals is outputted from each of first, second and third connecting nodes N1, N2 and N3 in each of the first, second and third LC resonant circuits, respectively. Generation periods of the first, second and third oscillation signals can be displaced from each other by displacing first, second and third activation pulses GN1, GN2 and GN3 outputted from the first, second and third output buffer circuits 23a, 23b and 23c from each other so as not to overlap each other.

Each of first, second and third transmission gates TGa, TGb and TGc is turned on in corresponding each of the generation periods of the first, second and third oscillation signals. Each of the first, second and third oscillation signals is inputted to a common comparator 25 through corresponding each of the transmission gates TGa, TGb and TGc. Therefore, it is preferable that each of the first, second and third activation pulses GN1, GN2 and GN3 or a pulse based on each of them is used as a control signal to turn on/off corresponding each of the first, second and third transmission gates TGa, TGb and TGc.

The comparator 25 compares each of the first, second and third oscillation signals outputted in time sequence with a reference voltage Vref. A common counter 26 counts a number of pulses outputted from the comparator 25.

As described above, by displacing the generation periods of the first, second and third oscillation signals from each other, shared use of the comparator 25 and the counter 26 is made possible as well as preventing interference among the first, second and third oscillation signals.

Figure 6:
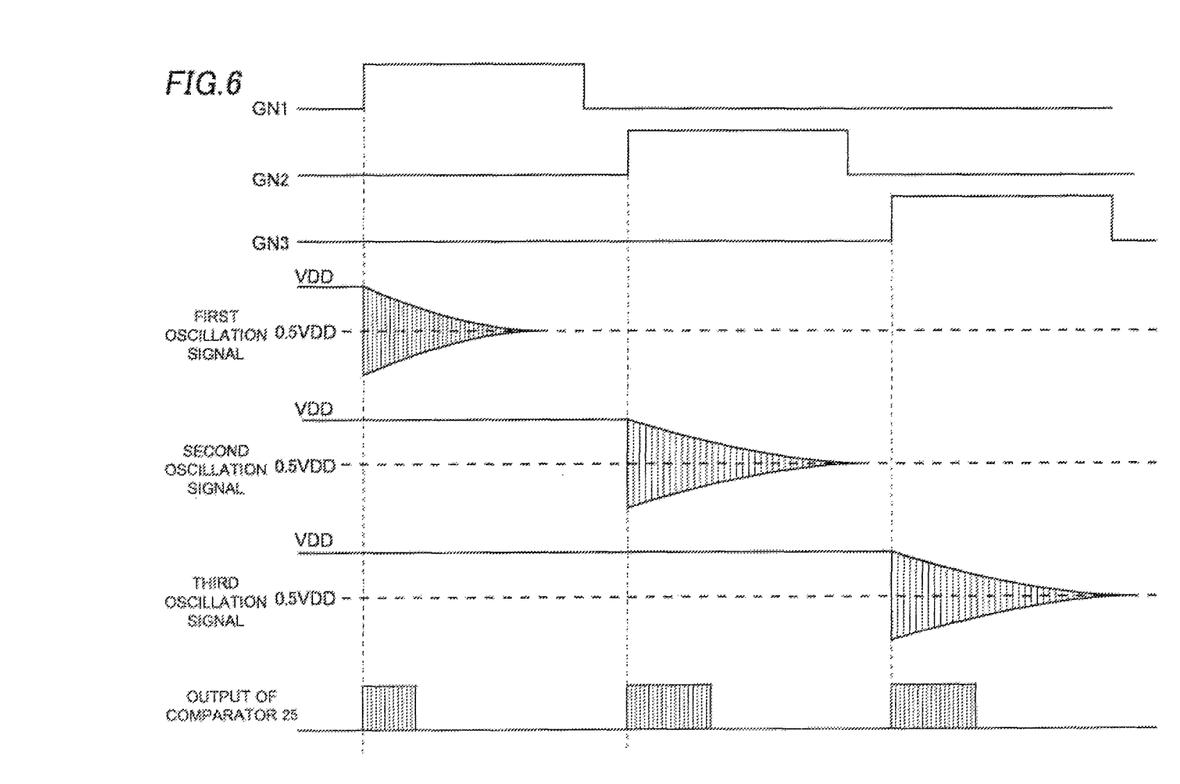
FIG. 6 is an operational waveform diagram of the rotation detection unit according to the second embodiment of this invention.

FIG. 6 is an operational waveform diagram of the rotation detection unit 6B in the water meter according to the second embodiment. Each of the first, second and third capacitors 5a, 5b and 5c is charged by each of charging pulses GP1, GP2 and GP3, respectively, and thereafter the first, second and third activation pulses GN1, GN2 and GN3 are generated one after another so as not to overlap each other.

In an example shown in FIG. 6, attenuation of the first oscillation signal is relatively fast, and the number of pulses outputted from the comparator 25 is relatively small accordingly. On the other hand, attenuation of each of the second and third oscillation signals is relatively slow, and the number of pulses outputted from the comparator 25 is relatively large accordingly. From information described above, an arithmetic unit 7A can judge that the first coil 4a is above the metal portion 3a of the circular plate 3 and that the second and third coils 4b and 4c are above the insulator portion 4b.

That is, the arithmetic unit 7A samples in time sequence the information on whether each of the first, second and third coils 4a, 4b and 4c is above the metal portion 3a or above the insulator portion 3b of the circular plate 3 based on the number counted by the counter 26, and calculates the rotation speed of the circular plate 3 based on the information. Then, the flow rate of the water is calculated based on the rotation speed as in the conventional art.

Since the rotation states of the circular plate 3 are identified using the first, second and third coils 4a, 4b and 4c with the water meter according to the second embodiment, precision of the identification is enhanced compared with the water meter according to the first embodiment. The water meter may be provided with more than three coils. In that case, more than three corresponding LC resonant circuits are provided.

The first and second embodiments are related to the water meter. However, the scope of this invention is not limited to the water meter, and may be widely applied to a device for measuring a flow rate of liquid other than water or flow rate of gas as long as it measures the flow rate of the fluid basically by detecting a rotation speed of a circular plate that rotates at a rotation speed proportional to the flow rate of the fluid.

Since the water meter according to the first embodiment or the second embodiment uses the LC resonant circuit, it may malfunction under influence of strong magnetic field or electromagnetic wave (short wave). The malfunction may be exploited in unjustifiably reducing water bill. In that case, the number counted by the counter 26 becomes smaller than the normal number because there is caused an abnormal oscillation of the LC resonant circuit.

Therefore, it is preferable for reporting the malfunctioning that the arithmetic unit 7A is configured so that the counter 26 is forcibly reset when the number counted by the counter 26 is smaller than a predetermined number.

Or, it is preferable that the arithmetic unit 7A is configured so that a flag showing that the oscillation of the LC resonant circuit is abnormal is generated when the number counted by the counter 26 is smaller than the predetermined number instead.

Since the spike current at the activation of the LC resonant circuit is suppressed with the fluid flow rate measuring device or the water meter according to each of the embodiments of this invention, the smoothing capacitor of large capacitance is no longer required and the number of parts is reduced. In addition, the structure of the circuit is simplified because there is no need for the reference clock of high frequency to control the pulse width of the activation pulse for the LC resonant circuit and the like.

While the fluid flow rate measuring device according to the embodiment of this invention is suitable for the water meter, it may be applied to a flow rate measuring device for a liquid other than water or gas.

What is claimed is:

1. A fluid flow rate measuring device having a circular plate comprising a metal portion disposed on its principal surface and an insulator portion disposed on the rest of the principal surface and rotating at a rotation speed proportional to a flow rate of a fluid and measuring the flow rate of the fluid based on the rotation speed of the circular plate, comprising:

an LC resonant circuit comprising a coil disposed above the principal surface of the circular plate, the coil having a first terminal and a second terminal, a first switching device connected in series with the coil, and a capacitor having a first terminal and a second terminal connected in parallel with the coil and the first switching device that are connected in series, wherein the first switching device has a control terminal and first and second current carrying terminals, the first current carrying terminal of the first switching device coupled for receiving a first source of operating potential, and the second current carrying terminal of the first switching device coupled to the first terminal of the coil, and wherein the first switching device is configured to have an adjustable ON resistance;

a second switching device for charging the capacitor, the second switching device having a control terminal, a first current carrying terminal, and a second current carrying terminal, the second current carrying terminal of the second switching device coupled to the second terminal of the coil and the second terminal of the capacitor and the first current carrying terminal of the second switching device coupled for receiving a second source of operating potential, the second source of operating potential at a voltage greater than a voltage of the first source of operating potential;

a resistor coupled between the second current carrying terminal of the second switching device and the coil, the LC resonant circuit being activated to output the oscillation signal by turning on the first switching device after the capacitor has been charged in response to turning on the second switching device;

an output buffer circuit having an input, an output, a first supply terminal, and a second supply terminal, the output buffer circuit configured to change the ON resistance of the first switching circuit, to have an adjustable output impedance, and to output a switching signal for controlling turning on/off of the first switching device, wherein the output buffer circuit is configured so that a transition time of the switching signal at the turning on of the first switching device is adjustable;

a charge pump coupled to the first supply terminal of the output buffer circuit and configured to change an output voltage level of the output buffer circuit, wherein the charge pump is configured to generate the output voltage level to be greater than the first source of operating potential and the second source of operating potential, and wherein the second supply terminal of the output buffer circuit is coupled for receiving an output impedance control signal to change the output impedance of the output buffer circuit;

a comparator comparing the oscillation signal from the LC resonant circuit with a reference voltage;

a counter having a first input, a second input, and an output, the first input of the counter coupled to the output of the comparator and the second input of the counter coupled for receiving a reset signal, the counter configured to count a number of pulses outputted from the comparator; and an arithmetic unit obtaining information on whether the coil is above the metal portion or above the insulator portion based on the number of pulses counted by the counter and calculating the rotation speed of the circular plate based on the information.

2. The fluid flow rate measuring device of claim 1, wherein the arithmetic unit resets the counter when the number counted by the counter is smaller than a predetermined number.

3. The fluid flow rate measuring device of claim 1, wherein the arithmetic unit generates a flag showing an abnormal oscillation of the LC resonant circuit when the number counted by the counter is smaller than a predetermined number.

4. The fluid flow rate measuring device of claim 1, wherein the reference voltage is set variably.

5. The liquid flow rate measuring device of claim 4, wherein the reference voltage is generated by a DA converter.

6. The fluid flow rate measuring device of claim 1, wherein the arithmetic unit comprises a microcomputer.

7. A fluid flow rate measuring device having a circular plate comprising a metal portion disposed on a first portion of a principal surface and an insulator portion disposed on a second portion of the principal surface and rotating at a rotation speed proportional to a flow rate of a fluid and measuring the flow rate of the fluid based on the rotation speed of the circular plate, comprising:

a first switching device having a control terminal, a first current carrying terminal and a second current carrying terminal, wherein the first current carrying terminal of the first switching device is coupled for receiving a first source of operating potential that is at a first voltage level;

a first resistor coupled to the second current carrying terminal of the first switching device;

a first LC resonant circuit comprising a second switching device connected in series with a first coil and a first capacitor connected in parallel with the second switching device and the first coil that are connected in series, the first coil disposed above the principal surface of the circular plate, wherein the second switching device has a control terminal, a first current carrying terminal, and a second current carrying terminal, the first current carrying terminal of the second switching device is connected to a first terminal of the first coil and the second current carrying terminal of the second switching device is coupled for receiving a second source of operating potential that is at a second voltage level and to a first terminal of the first capacitor, the first voltage level greater than the second voltage level, and wherein the second switching device is configured to have an adjustable ON resistance;

a first buffer circuit having an input, an output, a first supply terminal, and a second supply terminal, the output of the first buffer circuit coupled to the control terminal of the second switching device and configured to change the ON resistance of the second switching device;

a first charge pump coupled to the first supply terminal of the first buffer circuit and configured to change an output voltage level of the first buffer circuit and wherein the second supply terminal of the first buffer circuit is coupled for receiving a first output impedance control signal to change the output impedance of the first buffer circuit;

a third switching device having a control terminal, a first current carrying terminal and a second current carrying terminal, wherein the first current carrying terminal of the third switching device is directly coupled for receiving the first source of operating potential at the first voltage level;

a second resistor coupled to the second current carrying terminal of the third switching device;

a second LC resonant circuit comprising a fourth switching device connected in series with a second coil and a second capacitor connected in parallel with the fourth switching device and the second coil that are connected in series, the second coil disposed above the principal surface of the circular plate, wherein the fourth switching device has a control terminal, a first current carrying terminal, and a second current carrying terminal, the first current carrying terminal of the fourth switching device is connected to a first terminal of the second coil and the second current carrying terminal of the fourth switching device is coupled for receiving the second source of operating potential at the second voltage level and to a first terminal of the second capacitor, and wherein the fourth switching device is configured to have an adjustable ON resistance;

a second buffer circuit having an input, an output, a first supply terminal, and a second supply terminal, the output of the second buffer circuit coupled to the control terminal of the fourth switching device and configured to change the ON resistance of the fourth switching device;

a second charge pump coupled to the first supply terminal of the second buffer circuit and configured to change an output voltage level of the second buffer circuit and wherein the second supply terminal of the second buffer circuit is coupled for receiving a second output impedance control signal to change the output impedance of the second buffer circuit;

a fifth switching device having a control terminal, a first current carrying terminal and a second current carrying terminal, wherein the first current carrying terminal of the fifth switching device is directly coupled for receiving the first operating potential at the first voltage level;

a third resistor coupled to the second current carrying terminal of the fifth switching device;

a third LC resonant circuit comprising a sixth switching device connected in series with a third coil and a third capacitor connected in parallel with the sixth switching device and the third coil that are connected in series, the third coil disposed above the principal surface of the circular plate, wherein the sixth switching device has a control terminal, a first current carrying terminal, and a second current carrying terminal, the first current carrying terminal of the sixth switching device connected to a first terminal of the third coil and the second current carrying terminal of the sixth switching device coupled for receiving the second source of operating potential at the second voltage level and to a first terminal of the third capacitor, and wherein the sixth switching device is configured to have an adjustable ON resistance;

a third buffer circuit having an input, an output, a first supply terminal, and a second supply terminal, the output of the third buffer circuit coupled to the control terminal of the sixth switching device and configured to change the ON resistance of the sixth switching device;

a third charge pump coupled to the first supply terminal of the third buffer circuit and configured to change an output voltage level of the third buffer circuit and wherein the second supply terminal of the third buffer circuit is coupled for receiving a third output impedance control signal to change the output impedance of the third buffer circuit; wherein the second switching device is configured for charging the first capacitor, wherein the first LC resonant circuit is configured to be activated to output an oscillation signal by turning on the second switching device after the first capacitor has been charged in response to turning on the first switching device;

a comparator comparing the oscillation signal from each of the LC resonant circuits with a reference voltage;

a counter counting a number of pulses outputted from the comparator; and an arithmetic unit obtaining information on whether each of the coils is above the metal portion or above the insulator portion based on the number of pulses counted by the counter and calculating the rotation speed of the circular plate based on the information.

8. The fluid flow rate measuring device of claim 7, further comprising a selection circuit sequentially selecting each of a plurality of the oscillation signals outputted from the first, second, and third LC resonant circuits, wherein periods during each of which the oscillation signal from each of the first, second, and third LC resonant circuits is outputted are displaced from each other by displacing periods during each of which the first switching device in each of the first, second, and third LC resonant circuits is turned on from each other, and wherein the comparator compares the oscillation signal selected by the selection circuit with the reference voltage.

9. The fluid flow rate measuring device of claim 7, wherein the arithmetic unit resets the counter when the number counted by the counter is smaller than a predetermined number.

10. The fluid flow rate measuring device of claim 7, wherein the arithmetic unit generates a flag showing an abnormal oscillation of at least one of the first, second, and third LC resonant circuits when the number counted by the counter is smaller than a predetermined number.

11. A water meter comprising:
a circular plate comprising a metal portion disposed on its principal surface and an insulator portion disposed on the rest of the principal surface, the circular plate rotating at a rotation speed proportional to a flow rate of water;
a first switching device having a control terminal, a first current carrying terminal, and a second current carrying terminal;
a first resistor coupled to the second current carrying terminal of the first switching device;
an LC resonant circuit comprising a coil disposed above the principal surface of the circular plate, a second switching device connected in series with the coil and a capacitor connected in parallel with the coil and the second switching device that are connected in series, wherein the first switching device is configured for charging the capacitor, the LC resonant circuit being activated to output an oscillation signal by turning on the second switching device after the capacitor has been charged in response to turning on the first switching device, wherein the second switching device has a control terminal and first and second current carrying terminals, the first current carrying terminal of the second switching device coupled for receiving a first source of operating potential, and the second current carrying terminal of the second switching device coupled to the first terminal of the coil, and wherein the second switching device is configured to have an adjustable ON resistance;
an output buffer circuit having an input, an output, a first supply terminal, and a second supply terminal, the output of the output buffer circuit coupled to the control terminal of the first switching device and configured to change the ON resistance of the first switching device;
a charge pump coupled to the first supply terminal of the buffer circuit and configured to change an output voltage level of the output buffer circuit and wherein the second supply terminal of the output buffer circuit is coupled for receiving an output impedance control signal to change the output impedance of the output buffer circuit;
a comparator comparing the oscillation signal from the LC resonant circuit with a reference voltage;
a counter counting a number of pulses outputted from the comparator; and
an arithmetic unit obtaining information on whether the coil is above the metal portion or above the insulator portion based on the number of pulses counted by the counter and calculating the rotation speed of the circular plate based on the information.

12. The water meter of claim 11, wherein the arithmetic unit resets the counter when the number counted by the counter is smaller than a predetermined number.

13. The water meter of claim 11, wherein the arithmetic unit generates a flag showing an abnormal oscillation of the LC resonant circuit when the number counted by the counter is smaller than a predetermined number.

14. The water meter of claim 11, wherein the output buffer circuit outputs a switching signal for controlling turning on/off of the second switching device, and wherein the output buffer circuit is configured so that a transition time of the switching signal at the turning on of the second switching device is adjustable.

15. The water meter of claim 11, wherein the reference voltage is set variably.

16. The water meter of claim 15, wherein the reference voltage is generated by a DA converter.

17. The water meter of claim 11, wherein the arithmetic unit comprises a microcomputer.

18. A fluid flow rate measuring device configured to measure a flow rate of the fluid in response to a rotation speed of a circular plate having an insulator portion and a metal portion where the plate rotates in response to the flow rate of the fluid, the flow rate measuring device comprising:

an LC resonant circuit comprising a coil disposed above the circular plate, a first switching device connected in series with the coil, and a capacitor connected in parallel with the coil and the first switching device that are connected in series, the first switching device having a control terminal, a first current carrying terminal, and a second current carrying terminal, wherein the first switching device is configured to have an adjustable ON resistance;

a second switching device for charging the first capacitor, the second switching device having a control terminal, a first current carrying terminal, and a second current carrying terminal;

a first resistor coupled between the second current carrying terminal of the second switching device and the coil and between the second current carrying terminal of the second switching device and the capacitor, the LC resonant circuit being activated to output an oscillation signal by turning on the first switching device after the capacitor has been charged in response to turning on the second switching device;

a buffer circuit having an input, an output, a first supply terminal, and a second supply terminal, the output of the buffer circuit coupled to the control terminal of the first switching device and configured to change the ON resistance of the first switching device;

a charge pump coupled to the first supply terminal of the buffer circuit and configured to change an output voltage level of the buffer circuit and wherein the second supply terminal of the buffer circuit is coupled for receiving an output impedance control signal to change the output impedance of the buffer circuit;

a comparator having a first input, a second input, and an output, the comparator configured to compare the oscillation signal from the LC resonant circuit at the first input with a reference voltage at the second input;

a counter having a first input, a second input, and an output and configured for counting a number of pulses outputted from the comparator, the first input of the counter coupled to the output of the comparator, and the second input of the counter coupled for receiving a reset signal; and an arithmetic logic unit coupled to the output of the counter.

19. The fluid flow rate measuring device of claim 18, further comprising a digital to analog converter circuit coupled to the second input of the comparator to provide the reference voltage.

20. The fluid flow measuring device of claim 18, wherein the charge pump changes the output voltage level of the buffer circuit to a level that is greater than a voltage at the second current carrying terminal of the first switching device and greater than a voltage at the first current carrying terminal of the second switching device.

21. The fluid flow rate measuring device of claim 7, wherein the charge pump sets the output voltage level of the first buffer circuit is greater than the first voltage level and the second voltage level.

22. The water meter of claim 11, wherein the charge pump changes the output voltage level of the output buffer circuit to a level greater than a voltage level of the first source of operating potential.

\* \* \* \* \*

UNITED STATES PATENT AND TRADEMARK OFFICE
CERTIFICATE OF CORRECTION

PATENT NO.         : 10,156,463 B2
APPLICATION NO.    : 13/754512
DATED              : December 18, 2018
INVENTOR(S)        : Yoshiaki Yonezawa et al.

It is certified that error appears in the above-identified patent and that said Letters Patent is hereby corrected as shown below:

In the Claims

In Column 17, Line 10, delete "first".

Signed and Sealed this
Twelfth Day of March, 2019

Andrei Iancu
*Director of the United States Patent and Trademark Office*